July 16, 1968     W. E. BAKER     3,392,631
STEAM ENGINE

Filed Aug. 11, 1966     3 Sheets-Sheet 2

INVENTOR.
WILLIAM E. BAKER
BY
W. P. Carr
ATTORNEY

July 16, 1968  W. E. BAKER  3,392,631
STEAM ENGINE
Filed Aug. 11, 1966  3 Sheets-Sheet 3
FIG. 5
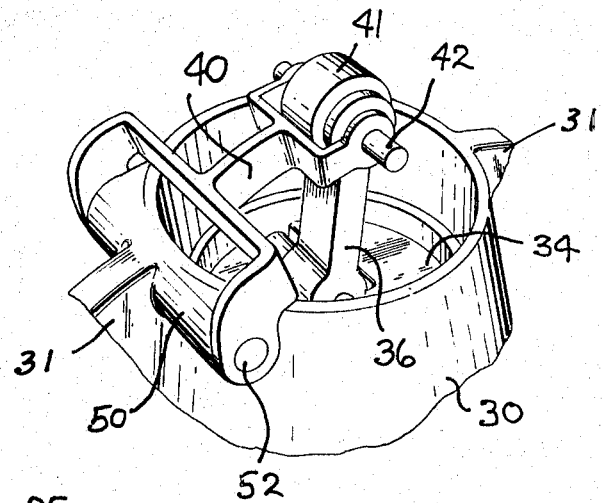
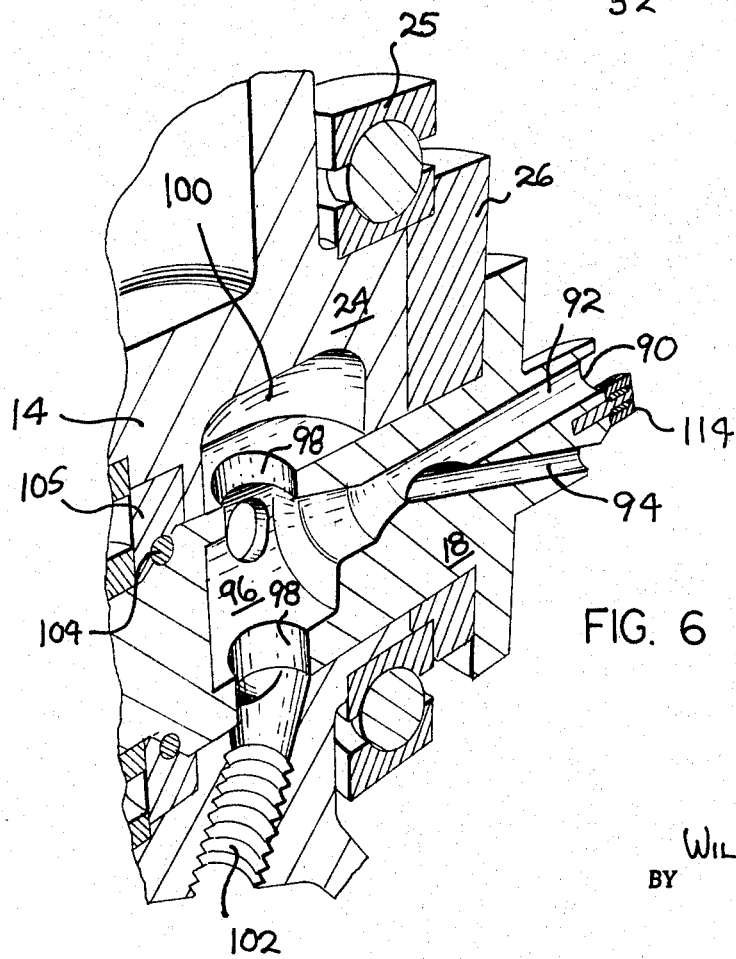
FIG. 6
INVENTOR.
WILLIAM E. BAKER
BY
W. P. Carr
ATTORNEY

United States Patent Office 3,392,631
Patented July 16, 1968

3,392,631
STEAM ENGINE
William E. Baker, 229 N. Main St.,
Swanton, Ohio 43558
Filed Aug. 11, 1966, Ser. No. 571,939
8 Claims. (Cl. 91—176)

ABSTRACT OF THE DISCLOSURE

A steam engine having a rotatable cylinder block with radially positioned cylinders, connecting rods projecting outwardly from the cylinders, a generally stationary steam valve shaft positioned axially of the cylinder block, a power transmitting shaft extending from the cylinder block, a rotatable cylindrical member positioned eccentrically in encircling relation to the cylinder block, the eccentricity of the cylindrical member causing the assembly of the cylinder block, pistons and connecting rods to be rotated within the cylindrical member and thereby to rotate the driving shaft, and attaching means between the cylinder block and the cylindrical member whereby the latter rotates with the cylinder block.

---

This invention relates to an engine designed primarily for operation by steam but which also may serve as an air motor.

The long acceptance and use of steam engines as prime movers in sizes ranging from toys to installations of 25,000 HP was based on substantial advantages over alternate machines: the power provided is ample and reliable, strong starting torque, and the power is easy to apply and govern. With no starting motor, ignition system, gears nor clutch required, there are few controls and there is ease of conversion to reverse operation.

In spite of the steam pressure and burners there is a high safety factor. No Stanley Steamer automobile was ever known to blow up. For driving automobiles, boats and other vehicles under present objectionable traffic conditions the quiet operation and lack of fumes of steam engines have special appeal.

Even with the recognized disadvantages of low efficiency, bulkiness, and stand-by loses steam engines still offer benefits not seriously challenged by other types of prime movers and are still preferred particularly where a boiler is necessary for the generation of heating steam or for other industrial uses. With the cited factors in mind it is the general object of this invention to provide an improved design of steam engine. More specifically it is an object of this invention to provide a steam engine of a more compact and lighter design.

Another object is the provision of a steam engine of greater efficiency while a still further object of the invention is to provide an engine of fewer parts and otherwise of less costly construction.

These and other objects and advantages of the invention are attained at least in part through features including a normally stationary valving shaft, easy turning of the valving shaft for reversal of the engine or adjustment of the valve port positions to vary the timing of the steam admission and exhaust from the cylinders, rotation of the cylinder block with the driven shaft, a rotation eccentric casing serving as a substitute for a crankshaft, a connection for correlating the rotation of the cylinder block with the rotation of the eccentric casing, and utilization of the driven shaft for exhaust steam passages.

These and other features of the invention are explained more fully hereafter in connection with the accompanying drawings in which:

FIGURE 5 is an enlarged perspective view with parts broken away of the outer end of a cylinder with the piston rod projecting therefrom and attached to its associated rocking arm; and FIGURE 6 is an enlarged fragmental section showing the main portion of the driven shaft with the steam exhaust passages therein.

Figure 1:
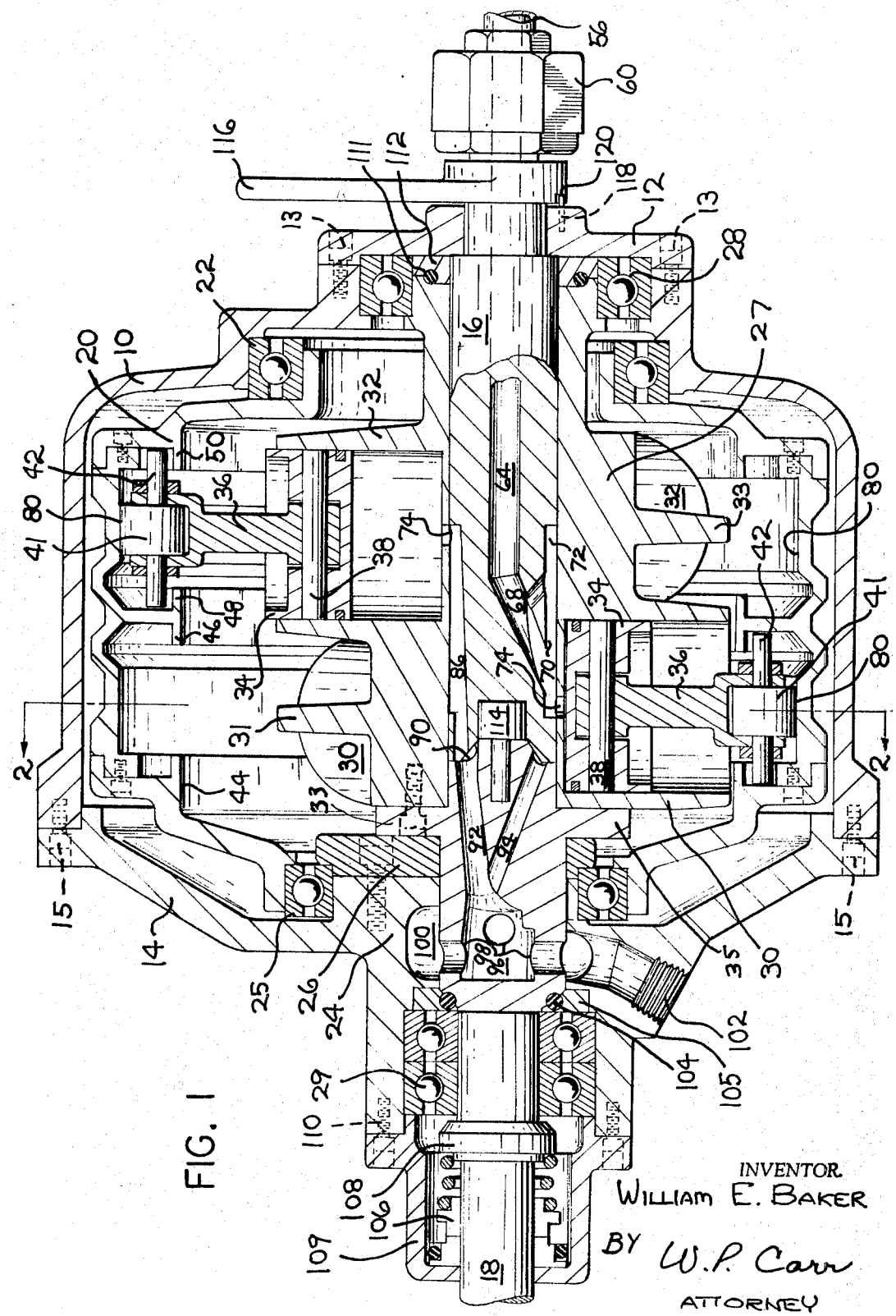
FIGURE 1 is a vertical longitudinal section of a steam engine embodying my invention.
Figure 2:
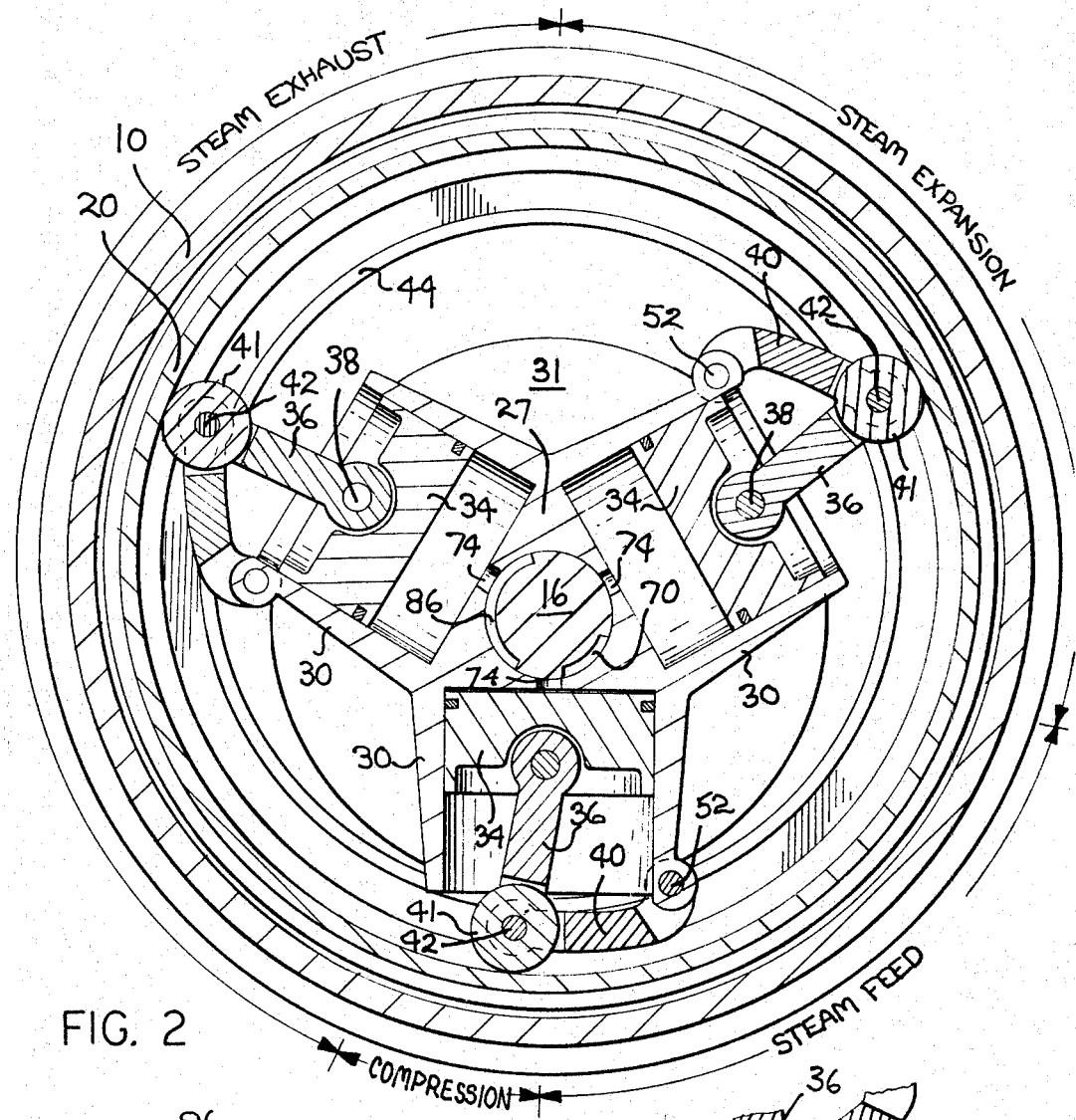
FIGURE 2 is a vertical cross section of the engine taken on the line 2—2 of FIGURE 1.

Referring to the drawings in more detail and first to the longitudinal and cross sections of the steam engine embodying this invention shown in FIGURES 1 and 2, the engine has an outer housing 10. An end cap 12 fastened by set or cap screws 13 closes one end of the housing 10. The other end of the housing is covered by the end bell 14 held in place by screws 15.

A generally stationary valving shaft 16 projects longitudinally into the housing 10 with the inner end of the valving shaft abutting against the inner end of the driven shaft 18.

A casing 20 which serves the function of a crankshaft to reciprocate the pistons, as will be later more fully explained, is mounted within the housing 10 eccentrically of the valving shaft 16 and the driven shaft 18. The casing 20 is supported on bearings 22 and 25, the latter being located on the inner cylindrical projection 24 of end bell 14 where it is held by retainer plate 26.

The rotatable engine body and cylinder block 27 rides at one end upon bearing 28 around the stationary valving shaft 16 and is supported at the other end through the driven shaft 18 on double bearings 29. The engine body 27 is fixed to the driven shaft by cap screws 33 which are threaded into the body through the flange 35 of the shaft.

In the engine body 27 are six cylinders in two sets of three, 30 and 32. The set 30 on the left side of FIGURE 1 is shown in section in FIGURE 2. An arcuate strengthening rib 31 joins adjacent cylinders.

The pistons 34 within cylinders 30 and 32 are joined to connecting rods 36 by wrist pins 38. On the outer end of each connecting rod is a thrust roller 41 mounted on an elongated pin 42. A rocker arm 40 has an end yoke riding on the projecting ends of the pin 42, as may be best seen in FIGURE 5. The rocker arm 40 is pivotably mounted on a rocker pin 52 which passes through a boss 50 on the outside of the skirt of the cylinder.

As shown most clearly in FIGURE 1 the ends of the rocker pins 52 project over flanges 44, 46, 48 and 50 of the casing 20 with a clearance which may be one-sixteenth of an inch. Through steam pressure and centrifugal force the pistons are thrust outwardly when the engine is in operation with the rollers against runways 80 on the inner surface of the casing 20. The flanges 44, 46, 48 and 50 through their engagement with the outer ends of the rocker pins 52 hold the pistons in their normal positions under idling or non-operating conditions.

Steam is delivered to the engine through tubing 56 which is connected to the outer end of the valving shaft 16 by the rotatable sealing coupling 60 shown in FIGURE 1. The steam flows down the axial bore 64 and from the lateral forked passage 68 enters the adjoining slots 70 and 72 in the surface of the shaft. From the slot 70 the steam has access to cylinders 30 through cylinder ports 74 while the steam reaches cylinders 32 through like ports 74 from the slot 72.

The steam is exhausted from cylinders 30 and 32 into the open channel 86 in valving shaft 16 from the cylinder ports 74. Communicating with the channel 86 is an annular groove 90 on the inner end of the driven shaft 18. Leading from groove 90 are converging passages 92 and 94 within shaft 18. (FIGURES 1 and 6.) These passages terminate in chamber 96 from which the exhaust steam travels through radial ports 98 into the surrounding chamber 100 within the end bell 24. The outlet passage 102 is threaded for receipt of piping to convey the steam to a condenser or other desired destination. Inner aligning support is provided the valving shaft 16 by the needle bearing 114 projecting from and mounted on the inner end of driven shaft 18.

To curb any escape of steam along the outside of shaft 18 a seal 104 is held against the shaft by retainer 105 on the inner side of bearings 29 and beyond the bearings there is the rotatable seal 106 held to its seat by a spring compressed against the annular shoulder 108 on the shaft. The small end cap 109 houses the seal 106 and covers the outer open end of the end bell 14 to which it is secured by screws 110.

Near the outer end of valving shaft 16 there is a steam blocking O-ring seal 111 in retainer 112 which is fixed to the end cap 12.

Exteriorly fixed to the valving shaft 16 is a hand lever 116. This enables rotatable adjustment of the shaft for changing the point of steam cut-off to the cylinders and to reverse direction of operation of the engine by a greater circumferential displacement of the valve passages. A pin 118 projecting from end cap 12 into a groove 120 in the base of the lever 116 limits the allowable movement of the lever and the valving shaft. The groove has a serrated wall to engage the pin and hold the lever and shaft in the position selected.

In the operation of the steam engine embodying the invention as herein disclosed a steam pressure between 300 and 500 pounds is recommended. However, the engine will function satisfactorily with steam at a pressure as high as 1000 pounds.

With the valve setting as shown in FIGURES 1 and 2 the engine rotates in a counter clock-wise direction as viewed in FIGURE 2. The lower piston there shown has finished its steam exhausting inner stroke with steam compressed in the minimum clearance space. With continued rotating movement steam from slot 70 passes through cylinder port 74 to impel the piston outwardly. As indicated, the steam feed may be continued for about forty-five percent of the power stroke, or eighty degrees of rotation, with the balance of the stroke under steam expansion. For more economical operation under uniform power requirements the steam expansion period is desirably lengthened.

With the outward movement of the piston under steam pressure the roller 41 on the outer end of the connecting rod 36 is thrust against the runway 80 on the inner wall of the casing 20. Due to the eccentric relation of the casing to the axis of rotation of the engine body 27 the forced contact of the roller 41 on the runway 80 moves the body around as the increased distance of the runway from the axis of the engine rotation permits outward movement of the piston and connecting rod. This action is progressive from the position of the lower cylinder in FIGURE 2, where the runway surface is closest to the axis of the engine rotation, to the opposite or upper position of the cylinder where the distance is the greatest. Thereafter, exhaust of the steam removes the major energy of the outward movement of the piston and allows the piston to be moved inwardly. The rotational impulse from each roller is transferred to the engine body through the respective rocker arm 40.

Each piston goes through this same cycle and with six cylinders as are here involved in sequential relation a smooth drive of the driving shaft 18 is obtained.

While the rotation of the engine would not be directly affected by having the casing stationary, however considerable benefit is derived from the unique feature of this invention of having the casing 20 rotate with the engine. The principal advantage thereof is the elimination of the major part of the friction which would be generated in the riding of the rollers 41 over the full inner periphery of the casing.

Figure 4:
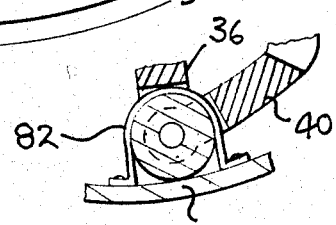
FIGURE 4 is a sectional view with parts broken away showing the connection of a connecting rod roller with the eccentric casing.

The correlated rotation of the engine and the eccentric casing is secured by having a connection between them. In this embodiment this attachment is accomplished by having one of the rollers 41 held within a U collar fixed to the inner wall of the casing 20 as illustrated in FIGURE 4. This connection carries the casing around with the engine body while still permitting full movement of the piston with which the particular roller 41 is associated.

The particular engine here disclosed as an embodiment of the invention has cylinders with one and three-quarters of an inch bore and a length permitting a stroke of fifteen-sixteenths of an inch. With steam pressure of 500 p.s.i. and at a r.p.m. of 1000 about twelve horse power should be developed.

The cylindrical runways 80 against which the connecting rod rollers 41 are thrust have a radius of approximately three and one-sixteeth of an inch with the axis of rotation approximately nine-sixteenths of an inch straight above the axis of the valving shaft 16 as viewed in FIGURE 2.

While the cylinders and the eccentric casing rotate generally in unison, due to outwardly and inwardly swinging of the rocker arms 40 and the attendent pivoting of the connecting rods 36 the rollers 41 move back and forth over an area about an inch long on the raceways 80 during each complete rotation of the engine. Since one of the rollers is locked to the casing this slight movement is transferred to the casing with no objectionable effect.

The simplified valving arrangement provided by this invention contributes importantly to the efficiency of the engine. The steam passages in the valving shaft 16 are straight throughout substantially their full lengths thus avoiding pressure losses from abrupt or multiple turns. The volumetric clearance is at a minimum with the separate steam inlet and exhaust outlets and with the steam released immediately adjacent to the cylinder inlet ports which are no more than one quarter of an inch in length.

There are no moving valve parts with the valving shaft set in a normally stationary position and located close to the cylinder heads instead of at the side thereof and the valving arrangement does not include the customary steam chest.

In operating conditions where more rapid release of the steam from the cylinders is desirable a circumferential row of exhaust ports may be provided in the wall of each cylinder which are uncovered when the piston has reached the limit of its outward movement. Passageways in the engine body would then provide a path for such steam to the steam discharge channel 86 in the valving shaft.

Figure 3:
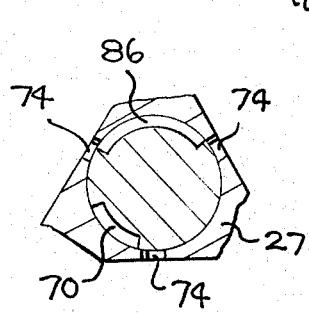
FIGURE 3 is a broken view of a cross section of the valving shaft as shown in FIGURE 2 but with the valving shaft turned to a position reversing the direction of operation of the engine.

The valving shaft is held in position against the steam pressure on the lower side by the engine housing at one end and the needle bearing 114 projecting from the driving shaft 18 at the other end. The valving shaft is easily adjusted through lever 116 to advance the steam admission and cut off through a slight clock-wise turn from the position shown in FIGURE 1, or to reverse the engine operation direction by a further turn to the position shown in FIGURE 3. As may be discerned from this view the exhaust slot 86 is closer to the inlet slot 70 with clock-wise rotation of the engine and there would accordingly be less power provided by the steam in the reverse operation with the disclosed valving structure.

The compact structure of the engine of this invention eliminates the bulkiness criticized in earlier steam engine designs. The cylinder heads are very closely positioned with no centrally nor longitudinally placed crankshaft. No piston rods nor crossheads are required with the simple eccentric casing and rocker arms which transform the piston reciprocation to rotary motion of the engine. The driving shaft is directly connected to the engine. Through this arrangement the rotating engine provides a flywheel effect.

The attendant low weight of the compact design establishes a weight of well below five pounds per horsepower with the six cylinders. With additional sets of three cylinders making totals of nine, twelve or fifteen cylinders the weight per horsepower would be further decreased. This low weight compares to seven pounds per horsepower in the average automobile internal combustion engine. A flange may be integrated with the housing 10 or bands on the order of those wrapped around electric motors may be utilized for mounting the engine.

The minimum movement between the connecting rod rollers 41 and the eccentric casing, and the lower number of moving parts reduces frictional losses as well as wear. While lubricating oil may be delivered with the steam it is preferred to have a forced oiling system with separate ducts.

Th avoidance of friction secured through the rotating eccentric casing is a feature which could be incorporated with special benefit in vane type engines and air motors in which the friction of the constant vane contact with the walls of conventional stationary casings is a serious problem and a source of severe wear. Rotation of the eccentric casing could be secured by having the outer end of one of the vanes fixed within a groove of the casing. The casing would preferably include the end walls of the compression chamber.

The fuel oil now available for firing a steam generator is considerably less costly than gasoline and there is quite complete combustion in its use under the usual steady conditions of consumption. This contrasts with the obnoxious fumes from the erratic operation of automobiles and trucks which presently contaminate the atmosphere. With the design of steam generators available, there is no delay in starting a steam engine. Even the old White Steamer as improved by Abner Doble required only thirty seconds to get under way.

It may be concluded from the foregoing that the steam engine provided by this invention satisfies the objects thereof in being compact, of light weight, of simple design, highly efficient, economical, and easy to control.

A particular embodiment of the invention has been here disclosed for purposes of explanation. It should be understood that other means may be easily designed for correlating the rotation of the eccentric casing and the engine body, for preventing the inward movement of the pistons during idling periods or shut-downs, or for following other novel aspects of this invention. Such obvious alternates and substitutions are considered to lie within the province of the invention and the scope of the appended claims.

What I claim is:

1. A steam engine having a rotatable cylinder block, radially positioned cylinders in the cylinder block, the heads of said cylinders being at the inner ends thereof, pistons in said cylinders, connecting rods joined to said pistons and projecting outwardly from said cylinders, a generally stationary steam valving shaft positioned axially and longitudinally of the cylinder block, a power transmitting driving shaft extending axially from and drivenly connected to said cylinder block, a rotatable cylindrical member positioned eccentrically in encircling relation to the cylinder block, inner runways on the cylindrical member for receiving the thrust of the outer ends of the connecting rods when the pistons are driven outwardly by steam pressure and to drive the pistons inwardly as the steam is exhausted from the cylinders, said connecting rods being generally free of attachment with said cylindrical member, the eccentricity of the cylindrical member causing the assembly of the cylinder block, pistons and connecting rods to be rotated within the cylindrical member and thereby to rotate the power transmitting driving shaft, and attaching means comprising a rocker arm between the cylinder block and the cylindrical member whereby the latter rotates with the cylinder block.

2. A steam engine having a rotatable cylinder block, radially positioned cylinders in the cylinder block, the heads of said cylinders being at the inner ends thereof, pistons in said cylinders, connecting rods joined to said pistons and projecting outwardly from said cylinders, a generally stationary steam valving shaft positioned axially and longitudinally of the cylinder block, a power transmitting driving shaft extending axially from and drivenly connected to said cylinder block, a rotatable cylindrical member positioned eccentrically in encircling relation to the cylinder block, inner runways on the cylindrical member for receiving the thrust of the outer ends of the connecting rods when the pistons are driven outwardly by steam pressure and to drive the pistons inwardly as the steam is exhausted from the cylinders, a roller on the end of each connecting rod, an axle on which the roller is mounted, and a rocker arm pivotally connected to the outer end of the associated cylinder and to said axle, the eccentricity of the cylindrical member causing the assembly of the cylinder block, pistons and connecting rods to be rotated within the cylindrical member and thereby to rotate the power transmitting driving shaft.

3. A steam engine according to claim 2 in which there are means for attaching the cylinder block to the cylindrical member which include a collar fixed to the inner wall of the cylindrical member within which the roller on the end of one of the connecting rods is enclosed and the rocker arm pivotally connected to the outer end of the associated cylinder and to the axle on which said roller is mounted.

4. A steam engine according to claim 2 in which said axles are elongated beyond the ends of the rollers and there are annular flanges within the cylindrical member limiting the inward movement of the connecting rods by being positioned radially under the ends of the elongated axles.

5. A steam engine having a rotatable cylinder block, radially positioned cylinders in the cylinder block, the heads of said cylinders being at the inner ends thereof, pistons in said cylinders, connecting rods joined to said pistons and projecting outwardly from said cylinders, steam inlet ports for delivering steam into the inner ends of the cylinders for driving the pistons outwardly, means for exhausting steam from said cylinders, means positioned exteriorly of and in encircling relation to the cylinder block and having inwardly impelling contact with the outer ends of the connecting rods to drive the pistons inwardly, an axial bore through the cylinder block, a normally stationary valving shaft extending into said bore, and a driving shaft driven by the cylinder block, said valving shaft having a steam supply passage and a steam exhaust passage, the inlet of the supply passage being at one end of the valving shaft and the outlet of the exhaust passage being at the other end of the valving shaft.

6. A steam engine according to claim 5 in which the inner end of said driving shaft abuts the inner end of the valving shaft, and there are means directly aligning the driving shaft and the valving shaft.

7. A steam engine according to claim 5 in which a continuation of one of the steam passages lies within the driving shaft.

8. A steam engine according to claim 5 in which there is an outer housing and the cylinder block is mounted on bearings supported within the housing, said bearings being independent of and in spaced relation to the valving shaft.

References Cited

UNITED STATES PATENTS

| | | | |
|---|---|---|---|
| 600,886 | 3/1898 | Obermeyer | 91—204 X |
| 1,300,706 | 4/1919 | Duby | 91—204 X |
| 2,054,110 | 9/1936 | Worth | 91—204 X |
| 3,165,069 | 1/1965 | Adamek | 103—161 |

MARTIN P. SCHWADRON, *Primary Examiner.*

EDGAR W. GEOGHEGAN, *Examiner.*

C. B. DORITY, *Assistant Examiner.*